United States Patent
Kimura et al.

(10) Patent No.: US 6,170,797 B1
(45) Date of Patent: *Jan. 9, 2001

(54) ROTARY ACTUATOR

(75) Inventors: Yasuhito Kimura; Keisuke Inoue, both of Yawara-mura (JP)

(73) Assignee: SMC Corporation, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/941,510

(22) Filed: Sep. 30, 1997

(30) Foreign Application Priority Data

Oct. 14, 1996 (JP) .................................... 8-289064

(51) Int. Cl.$^7$ .................................... F16K 31/143
(52) U.S. Cl. .................................... 251/62; 251/58
(58) Field of Search .................................... 251/62, 63, 58, 251/63.4, 63.5, 63.6

(56) References Cited

U.S. PATENT DOCUMENTS

| | | |
|---|---|---|
| 4,260,128 | 4/1981 | Tito . |
| 4,463,662 | 8/1984 | Okuyama . |
| 4,509,549 * | 4/1985 | Cooper et al. .................... 251/62 |
| 4,585,207 * | 4/1986 | Shelton .................... 251/62 |
| 4,838,146 | 6/1989 | Stoll . |
| 5,141,028 * | 8/1992 | Cohen .................... 251/62 |
| 5,346,173 | 9/1994 | Rasmusson . |
| 5,440,969 | 8/1995 | Shin . |

FOREIGN PATENT DOCUMENTS

| | | |
|---|---|---|
| DE GB 88 15 755 | 3/1989 | (DE) . |
| 0 017 628 | 10/1980 | (EP) . |
| 0 040 976 | 12/1981 | (EP) . |
| 0 092 987 | 11/1983 | (EP) . |
| 0 384 948 | 9/1990 | (EP) . |
| 0 519 185 | 12/1992 | (EP) . |
| 1 599 634 | 10/1981 | (GB) . |
| 56-141406 | 5/1981 | (JP) . |

* cited by examiner

Primary Examiner—David J. Walczak
(74) Attorney, Agent, or Firm—Baker Botts L.L.P.

(57) ABSTRACT

A rotary actuator in which, in order to realize cost reductions, the configuration of an extruded material used to form a cylinder body is modified to reduce the weight of the material, and the number of components or the number of manhours needed for machining is reduced by changing the method of installing a solenoid-operated switching valve, speed controllers and an open valve for short circuiting. The cylinder body (11) is produced from an extruded material (1) formed by extrusion. A section of the extruded material (1) that is perpendicular to the direction of extrusion of the extruded material (1) is circular at the inner periphery thereof and has upwardly, downwardly, leftwardly and rightwardly projecting thick-walled portions (12 to 15) at the outer periphery thereof. The outer peripheral portions of the section, exclusive of the projecting thick-walled portions (12 to 15), are generally formed from circular arcs.

7 Claims, 14 Drawing Sheets

ROTARY ACTUATOR

BACKGROUND OF THE INVENTION

The present invention relates to a rotary actuator operated by an air pressure and used to control a valve, for example.

FIGS. 11 to 15c show a conventional rotary actuator. A cylinder body 11 is produced by cutting an extruded material 1 (see FIG. 14c), formed by extruding aluminum or other similar material, into a predetermined length and forming various bores in the cut extruded material 1. As shown in FIGS. 14c, 14d and 11, a vertical section of the extruded material 1 has a circular bore (cylinder bore 11a) in the center. Squarish thick-walled portions 12 to 15 project from the extruded material 1 upwardly, downwardly, leftwardly and rightwardly, respectively, as viewed in the vertical section (in FIG. 12, the thick-walled portions 12 to 15 project upwardly, downwardly, forwardly and backwardly, respectively). A thick-walled portion 2 having an approximately triangular sectional configuration is formed between each pair of adjacent thick-walled portions 12 to 15. That is, the cylinder body 11 has a total of four thick-walled portions 2. Each thick-walled portion 2 has an insertion bore 3 extending therethrough longitudinally (i.e. the direction of the center axis of the cylinder bore 11a). As shown in FIGS. 11, 13 and 14d, a first end plate 17 and a second end plate 18, which are octagonal, are brought into contact with both ends of the cylinder body 11. The first end plate 17 and the second end plate 18 have insertion bores 19 formed in coaxial relation to the insertion bores 3 of the cylinder body 11. Four long bolts 5 are inserted into the insertion bores 19 of the first and second end plates 17 and 18 and the corresponding insertion bores 3 of the cylinder body 11, and nuts 6 are screwed onto the long bolts 5, respectively, thereby connecting together the cylinder body 11 and the first and second end plates 17 and 18.

An upper bearing portion 11b is formed in an approximately central portion of the upwardly projecting thick-walled portion 12 of the cylinder body 11. A lower bearing portion 11c is formed in an approximately central portion of the downwardly projecting thick-walled portion 13 of the cylinder body 11. An upper rotating shaft 24 and a lower rotating shaft 25 are rotatably fitted into and supported by the upper bearing portion 11b and the lower bearing portion 11c, respectively. The upper rotating shaft 24 has a prismatic portion at the lower end thereof. The prismatic portion of the upper rotating shaft 24 is fitted into a square hole provided in the upper end of a connecting shaft 21. The lower rotating shaft 25 has a prismatic portion at the upper end thereof. The prismatic portion of the lower rotating shaft 25 is fitted into a square hole provided in the lower end of the connecting shaft 21. If desired, a cap that indicates an angular position of the connecting shaft 21 is fitted to the upper end of the upper rotating shaft 24 that projects upwardly from the cylinder body 11. The lower end portion of the lower rotating shaft 25 projects downwardly from the cylinder body 11. A piston 20 is slidably fitted in the cylinder bore 11a. The piston 20 has a bottom portion 20a having a circular sectional configuration and adapted to receive an air pressure. The piston 20 further has a first projecting portion 20b and a second projecting portion 20c, which are integral with the bottom portion 20a. The upper and lower end portions of the piston 20, exclusive of the bottom portion 20a, are horizontally cut. The piston 20 has a vertical groove 20d vertically extending therethrough. The piston 20 further has longitudinal horizontal grooves communicated with the vertical groove 20d. Thus, the first projecting portion 20b and the second projecting portion 20c are formed as shown in FIGS. 11 and 13.

The second projecting portion 20c is provided with an insertion bore vertically extending therethrough. A pin 23 is inserted into the insertion bore. The connecting shaft 21 is located in the vertical groove 20d between the first projecting portion 20b and the second projecting portion 20c. A yoke 22 is inserted into a horizontal bore 21a provided in the connecting shaft 21. One end of the yoke 22 is pivotably connected to the pin 23. The other end of the yoke 22 is movably inserted into the horizontal groove of the first projecting portion 20b. As the piston 20 moves, the pin 23 also moves simultaneously, and the one end of the yoke 22 moves together with the pin 23. Consequently, the yoke 22 pivots to rotate about the vertical axis of the connecting shaft 21, causing the connecting shaft 21 to rotate. As the connecting shaft 21 rotates, the upper rotating shaft 24 and the lower rotating shaft 25 rotate simultaneously. The first end plate 17 has a first stopper 27 screwed into a threaded bore provided therein. Similarly, the second end plate 18 has a second stopper 28 screwed into a threaded bore provided therein. The first and second stoppers 27 and 28 have respective nuts screwed thereon so as to be fixed in predetermined positions, respectively. When moved back and forth, the piston 20 comes in contact with the distal ends of the first and second stoppers 27 and 28. By changing the fixed positions of the first and second stoppers 27 and 28, the stroke of the piston 20 is adjusted, and the rotation angle of the connecting shaft 21 is regulated.

As shown in FIG. 13, a pressure reducing valve 30 is connected to the outer side of the first end plate 17, and a pressure gauge 31 is provided in connection with the pressure reducing valve 30. As will be clear from FIG. 14a, a solenoid-operated switching valve 33 is connected through a sub-plate 32 to the center of the front (left side) surface of the leftwardly projecting thick-walled portion 14 of the cylinder body 11. Further, a first speed controller 34 and a second speed controller 35 are connected to the left and right end portions, respectively, of the leftwardly projecting thick-walled portion 14. An inlet port of the pressure reducing valve 30 is communicated with an air pressure source (not shown) through piping. An outlet port of the pressure reducing valve 30 is communicated with an inlet port of the solenoid-operated switching valve 33 through piping 7a. An A-port the solenoid-operated switching valve 33 is communicated with one port of the first speed controller 34 through piping 7b. A B-port of the solenoid-operated switching valve 33 is communicated with one port of the second speed controller 35 through piping 7c. The other port of the first speed controller 34 is communicated with a first cylinder chamber 38 of the cylinder body 11 through a communicating passage 8a (see FIG. 13). The other port of the second speed controller 35 is communicated with a second cylinder chamber 39 of the cylinder body 11 through a communicating passage 8b (see FIG. 13). An open valve 36 for short circuiting is communicated between the piping 7b and the piping 7c. By opening the open valve 36, the first cylinder chamber 38 and the second cylinder chamber 39 are communicated with each other through the first speed controller 34 and the second speed controller 35. Consequently, the connecting shaft 21 can be rotated by a manual operation. It should be noted that, as shown in FIG. 14b, the open valve 36 enables the passages to be communicated with or cut off from each other by rotating a ball valve element 36a with a lever 36b.

FIG. 11 shows a conventional rotary actuator 9 as used to open and close a valve (e.g. a butterfly valve or a ball valve)

40. The lower end of the rotary actuator 9 and an upper flange 40b of the valve 40 are connected by a connecting member 41, bolts 42 and nuts 43. The lower rotating shaft 25 has a prismatic portion at the lower end thereof. The prismatic portion of the lower rotating shaft 25 is fitted into an upper square hole provided in a connector 44. A control shaft 45 of the valve 40 has a prismatic portion at the upper end thereof. The prismatic portion of the control shaft 45 is fitted into a lower square hole provided in the connector 44. The rotation of the connecting shaft 21 is transmitted to a valve element 40a of the valve 40 through the lower rotating shaft 25, the connector 44 and the control shaft 45.

FIGS. 15a to 15c show conventional methods of installing a filter 47 onto the rotary actuator 9. The filter 47 is installed such that a drain valve 47a lies at the lower end at all times. Conventionally, the filter 47 is attached to the rightwardly projecting thick-walled portion 15. The valve 40 and the rightwardly projecting thick-walled portion 15 vary in posture according to where the valve 40 is used. Therefore, when the rightwardly projecting thick-walled portion 15 lies horizontally as shown in FIG. 15a, a first L-shaped bracket 48a is attached to the filter 47, and the first L-shaped bracket 48a is connected to the rightwardly projecting thick-walled portion 15. When the rightwardly projecting thick-walled portion 15 lies vertically as shown in FIG. 15b, the first L-shaped bracket 48a is attached to the filter 47, and a plate 48b is connected to the first L-shaped bracket 48a. Then, the plate 48b is connected to the rightwardly projecting thick-walled portion 15. When the rightwardly projecting thick-walled portion 15 faces upward as shown in FIG. 15c, the first L-shaped bracket 48a is attached to the filter 47, and a second L-shaped bracket 48c is connected to the first L-shaped bracket 48a. Then, the second L-shaped bracket 48c is connected to the rightwardly projecting thick-walled portion 15.

SUMMARY OF THE INVENTION

As the competition between corporations in the field of air compressors heats up, it has recently become imperative to reexamine rotary actuators in all aspects and to achieve reductions in costs of rotary actuators.

To realize reductions in costs of rotary actuators, a first object of the present invention is to modify the configuration of an extruded material used to form a cylinder body so as to reduce the weight of the material.

A second object of the present invention is to reduce the number of components or the number of manhours needed for machining by changing the method of installing a solenoid-operated switching valve, speed controllers and an open valve for short circuiting.

A third object of the present invention is to provide a low-cost structure for a short-circuiting open valve.

A fourth object of the present invention is to provide an installation method for a filter whereby the number of components needed therefor is minimized and the cost is reduced.

A fifth object of the present invention is to provide a method of connecting together a butterfly valve or a ball valve and a connecting shaft of a rotary actuator, whereby the number of components needed therefor is minimized and the cost is reduced.

According to a first aspect of the present invention, there is provided a rotary actuator of the type wherein two end plates are connected to both ends, respectively, of a cylinder body, and a piston is slidably fitted in a cylinder bore in the cylinder body, and wherein an output shaft is disposed to extend in a direction approximately perpendicular to the axis of the piston, so that a reciprocating motion of the piston is converted into a rotational motion of the output shaft. The cylinder body is produced from an extruded material formed by extrusion. A section of the extruded material that is perpendicular to the direction of extrusion of the extruded material is circular at the inner periphery thereof and has upwardly, downwardly, leftwardly and rightwardly projecting thick-walled portions at the outer periphery thereof. The outer peripheral portions of the section, exclusive of the projecting thick-walled portions, are generally formed from circular arcs.

According to a second aspect of the present invention, the leftwardly and rightwardly projecting thick-walled portions of the cylinder body in the above-described rotary actuator have insertion holes extending therethrough longitudinally. The upwardly and downwardly projecting thick-walled portions have bolt bores with a predetermined length formed in both end portions thereof. The two end plates each have insertion bores respectively extending through the upper, lower, left and right portions thereof. Long bolts are respectively inserted into the insertion bores in the left and right portions of the two end plates and further into the insertion bores in the leftwardly and rightwardly projecting thick-walled portions of the cylinder body and engaged with respective nuts. Short bolts are respectively inserted into the insertion bores in the upper and lower portions of the two end plates and screwed into the bolt bores in the upwardly and downwardly projecting thick-walled portions of the cylinder body.

According to a third aspect of the present invention, there is provided a rotary actuator of the type wherein two end plates are connected to both ends, respectively, of a cylinder body, and a piston is slidably fitted in a cylinder bore in the cylinder body, and wherein an output shaft is disposed to extend in a direction approximately perpendicular to the axis of the piston, so that a reciprocating motion of the piston is converted into a rotational motion of the output shaft. The cylinder body is produced from an extruded material formed by extrusion. A section of the extruded material that is perpendicular to the direction of extrusion of the extruded material is circular at the inner periphery thereof and has a leftwardly projecting thick-walled portion at the outer periphery thereof. The leftwardly projecting thick-walled portion has an A-passage, a B-passage, a P-passage, an R-passage and an R'-passage communicated with an A-port, a B-port, a P-port, an R-port and an R'-port, respectively, of a solenoid-operated switching valve. One end of each of the A-passage, B-passage, P-passage, R-passage and R'-passage opens on the left side surface of the leftwardly projecting thick-walled portion. The other end of the A-passage is communicated with a first cylinder chamber through a first horizontal passage. The other end of the B-passage is communicated with a second cylinder chamber through a second horizontal passage. The other end of the P-passage is communicated with an air supply bore opening on the lower surface of the leftwardly projecting thick-walled portion. The other ends of the R-passage and R'-passage are communicated with an air exhaust bore opening on the lower surface of the leftwardly projecting thick-walled portion.

According to a fourth aspect of the present invention, the leftwardly projecting thick-walled portion in the arrangement according to the third aspect of the present invention has an open valve fitting bore vertically formed therein. The upper end of the open valve fitting bore opens on the upper surface of the leftwardly projecting thick-walled portion. The lower end portion of the open valve fitting bore is communicated with the first horizontal passage and the second horizontal passage. A valve rod is placed in thread engagement with the open valve fitting bore. An elastic valve element is fitted on a small-diameter portion near the lower end of the valve rod, so that rotating the valve rod causes the elastic valve element to move to a position where the first horizontal passage and the second horizontal passage are communicated with each other or to a position where the first horizontal passage and the second horizontal passage are cut off from each other.

According to a fifth aspect of the present invention, the leftwardly projecting thick-walled portion in the arrangement according to the third or fourth aspect of the present invention has fitting bores formed at respective positions near both ends thereof. One end of each of the fitting bores opens on the left side surface of the leftwardly projecting thick-walled portion. The other ends of the fitting bores are communicated with the first cylinder chamber and the second cylinder chamber through communicating passages, respectively. The body of a first speed controller and the body of a second speed controller are fitted in the fitting bores, respectively. The first horizontal passage and the second horizontal passage are communicated with the communicating passages through flow control portions and passages, respectively, which are provided in the bodies of the first and second speed controllers. The first horizontal passage and the second horizontal passage are communicated with the communicating passages through check valves, respectively, which are provided between the fitting bores and the bodies of the first and second speed controllers.

According to a sixth aspect of the present invention, there is provided a rotary actuator of the type wherein two end plates are connected to both ends, respectively, of a cylinder body, and a piston is slidably fitted in a cylinder bore in the cylinder body, and wherein an output shaft is disposed to extend in a direction approximately perpendicular to the axis of the piston, so that a reciprocating motion of the piston is converted into a rotational motion of the output shaft. The cylinder body is produced from an extruded material formed by extrusion. A section of the extruded material that is perpendicular to the direction of extrusion of the extruded material is circular at the inner periphery thereof and has upwardly and downwardly projecting thick-walled portions at the outer periphery thereof. The upwardly projecting thick-walled portion has an upper bearing portion vertically extending through a central portion thereof. The downwardly projecting thick-walled portion has a lower bearing portion vertically extending through a central portion thereof. The upper bearing portion has an inner diameter smaller than the inner diameter of the lower bearing portion. The output shaft is a stepped output shaft having at the upper end thereof a smaller-diameter portion rotatably fitted in the upper bearing portion. The lower end portion of the output shaft is rotatably fitted in the lower bearing portion. A square hole opens on the lower end surface of the output shaft.

According to a seventh aspect of the present invention, a connecting member having a longitudinal U-shaped groove on the upper surface thereof is connected to the downwardly projecting thick-walled portion in the arrangement according to the sixth aspect of the present invention. The connecting member has a shaft insertion bore extending through the bottom of the U-shaped groove thereof such that the shaft insertion bore lies in coaxial relation to the lower bearing portion of the downwardly projecting thick-walled portion. A prismatic portion at the upper end of a control shaft of a valve is fittable into the square hole at the lower end of the output shaft through the shaft insertion bore. An upper flange of the valve is connectable to the connecting member.

According to an eighth aspect of the present invention, there is provided a rotary actuator of the type wherein two end plates are connected to both ends, respectively, of a cylinder body, and a piston is slidably fitted in a cylinder bore in the cylinder body, and wherein an output shaft is disposed to extend in a direction approximately perpendicular to the axis of the piston, so that a reciprocating motion of the piston is converted into a rotational motion of the output shaft. The cylinder body is produced from an extruded material formed by extrusion. A section of the extruded material that is perpendicular to the direction of extrusion of the extruded material is circular at the inner periphery thereof and has upwardly, downwardly, leftwardly and rightwardly projecting thick-walled portions at the outer periphery thereof. The rightwardly projecting thick-walled portion has a pair of bolt bores opening on the right side surface thereof. The two end plates each have a pair of bolt bores opening on each of the upper left and upper right portions of each end plate. A filter is fitted into an insertion bore in one end portion of an L-shaped bracket. Two short bolts are inserted into either or both of upper and lower horizontally elongated insertion holes in the other end portion of the L-shaped bracket and screwed into any one of the pairs of bolt bores.

According to the first and second aspects of the present invention, the cylinder body is produced from an extruded material formed by extrusion, and a section of the extruded material that is perpendicular to the direction of extrusion of the extruded material is circular at the inner periphery thereof and has upwardly, downwardly, leftwardly and rightwardly projecting thick-walled portions at the outer periphery thereof. The outer peripheral portions of the section, exclusive of the projecting thick-walled portions, are generally formed from circular arcs. Thus, the four thick-walled portions (where bolts for connecting the end plates are inserted) with an approximately triangular sectional configuration as viewed in a section perpendicular to the direction of extrusion of the extruded material, which have been provided in the prior art, are eliminated. Therefore, the weight reduces, the material cost is saved, and the production cost lowers, correspondingly.

According to the present invention, the end plates can be connected to both ends of the cylinder body by inserting long bolts into insertion bores formed in the leftwardly and rightwardly projecting thick-walled portions and screwing short bolts into bolt bores formed in both end portions of the upwardly and downwardly projecting thick-walled portions. Thus, it is possible to obtain a rotary actuator that is equal in strength to the prior art.

According to the third to fifth aspects of the present invention, the leftwardly projecting thick-walled portion is provided with passages respectively communicated with the ports of a solenoid-operated switching valve. One end of each passage opens on the left side surface of the leftwardly projecting thick-walled portion, and the other ends of the passages are communicated with the first cylinder chamber, the second cylinder chamber, the air supply bore and the air exhaust bore, respectively. Therefore, if the solenoid-operated switching valve is brought into contact with the leftwardly projecting thick-walled portion and connected to the latter, it is possible to dispense with piping, a joint and a sub-plate as needed in the prior art. Accordingly, the number of components and the number of manhours needed for assembly and machining reduce. Thus, it is possible to realize cost reductions.

Moreover, because the open valve and the speed controllers are buried in the open valve fitting bore and the fitting bores, respectively, which are provided in the leftwardly projecting thick-walled portion, there is no need of external bodies (casings) for the open valve and the speed controllers. In addition, the structure of the open valve can be simplified by using the elastic valve element. Thus, it is possible to realize cost reductions by reducing the number of components and simplifying the structure.

According to the sixth and seventh aspects of the present invention, a stepped output shaft is employed. Therefore, the three shafts as used in the prior art can be replaced by a single output shaft. Moreover, because a prismatic portion at the upper end of the valve control shaft is fitted into a square hole in the lower end of the output shaft, there is no need of a connector and other associated members as needed in the prior art. Accordingly, the number of components and the number of manhours needed for machining can be reduced to a considerable extent.

According to the eighth aspect of the present invention, the structure of an L-shaped bracket for mounting a filter is changed such that the bracket can also be attached to either of the end plates of the rotary actuator. Accordingly, it becomes possible to install the filter onto the rotary actuator using only one type of L-shaped bracket, regardless of the posture of the rotary actuator, although two different types of L-shaped bracket and one type of plate have heretofore been required. Thus, the change of the filter installation method enables a reduction in the number of different types of components to be prepared. Consequently, the number of components and the number of manhours needed for installation reduce, and this contributes to cost reductions.

BRIEF DESCRIPTION OF THE DRAWINGS

FIG. 6 is a sectional view taken along the line E—E in FIG. 7a.

FIG. 8a is a fragmentary sectional view taken along the line D—D in FIG. 7a.

FIG. 8b is a fragmentary sectional view taken along the line P—P in FIG. 7a.

FIG. 8c is a fragmentary sectional view taken along the line R—R (R'—R') in FIG. 7a.

FIG. 8d is a fragmentary sectional view taken along the line A—A (B—B) in FIG. 7a.

DESCRIPTION OF THE PREFERRED EMBODIMENTS

Figure 1:
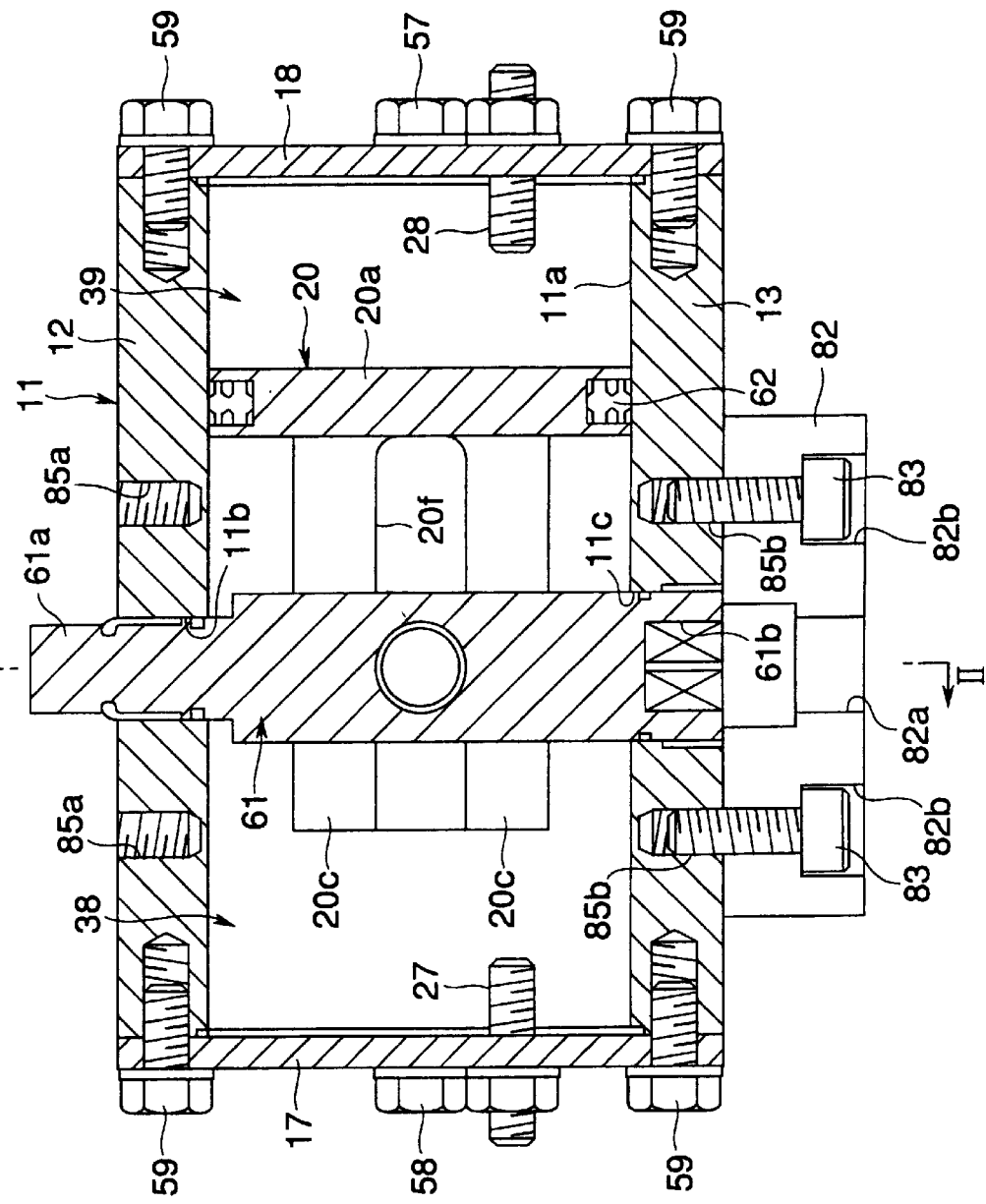
FIG. 1 is a sectional side view of an embodiment of the rotary actuator according to the present invention, taken along the line I—I in FIG. 2.

FIGS. 1 to 10c show an embodiment of the rotary actuator according to the present invention. In the description of the embodiment of the present invention, members similar to those of the conventional rotary actuator shown in FIGS. 11 to 15c are denoted by the same reference characters as those used in FIGS. 11 to 15c.

Figure 5:
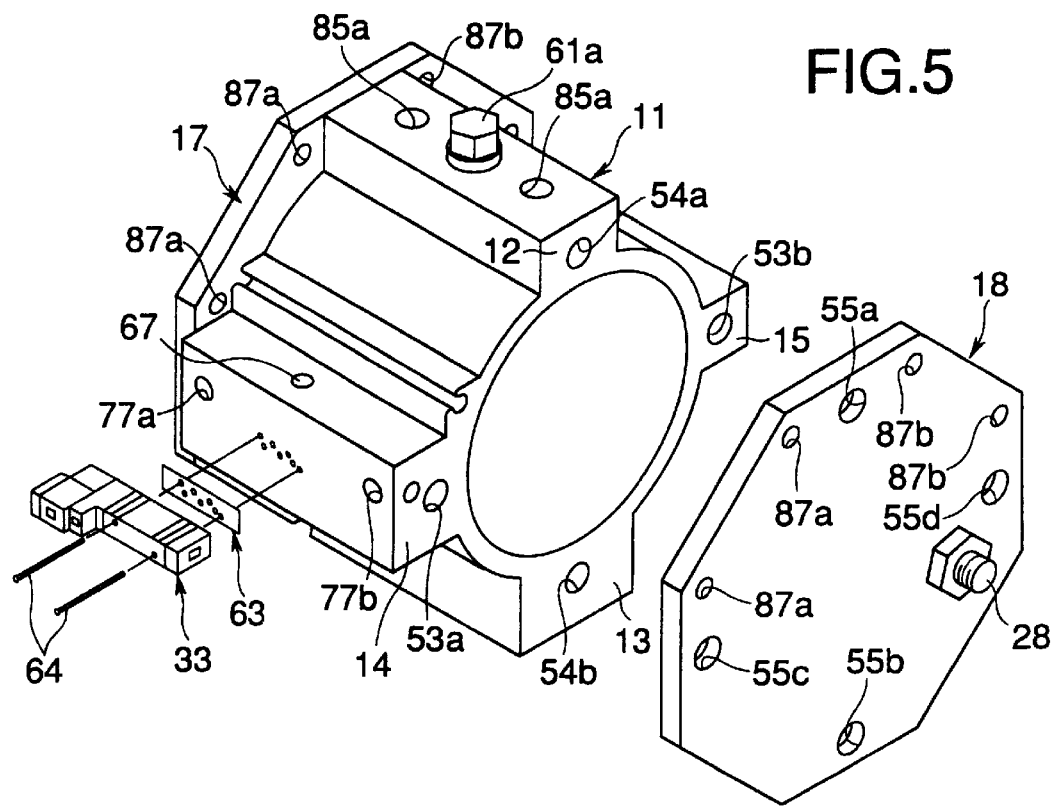
FIG. 5 is an exploded perspective view of the essential parts of the embodiment of the rotary actuator according to the present invention.
Figure 9A:
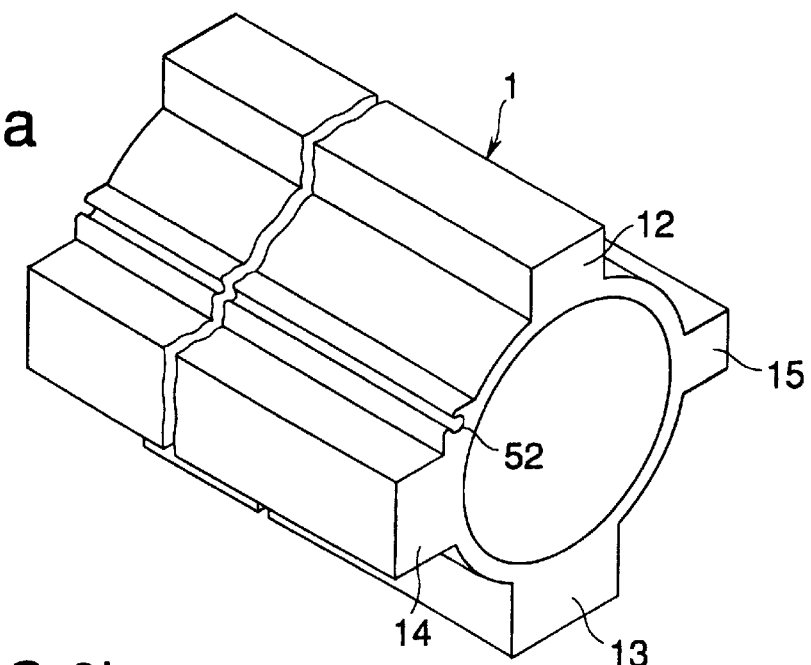
FIG. 9a is a perspective view of an extruded material used to produce the cylinder body in the embodiment of the rotary actuator according to the present invention.

As shown in FIGS. 5 and 9a, a cylinder body 11 is produced by cutting an extruded material 1, formed by extrusion of aluminum or other similar material, into a predetermined length. A section of the extruded material 1 that is perpendicular to the direction of extrusion is circular at the inner periphery thereof and has upwardly, downwardly, leftwardly and rightwardly projecting thick-walled portions 12 to 15 at the outer periphery thereof. The outer peripheral portions of the section, exclusive of the projecting thick-walled portions 12 to 15, are generally formed from circular arcs (except a mounting groove 52 formed in a portion adjacent to the leftwardly projecting thick-walled portion 14 on the upper side of the latter). The thick-walled portions 2 in the conventional rotary actuator are eliminated from the cylinder body 11.

As shown in FIGS. 1 and 5, the leftwardly and rightwardly projecting thick-walled portions 14 and 15 of the cylinder body 11 have respective insertion bores 53a and 53b extending therethrough longitudinally. The upwardly and downwardly projecting thick-walled portions 12 and 13 have respective bolt bores 54a and 54b each having a predetermined length. The bolt bores 54a are formed in both end portions of the upwardly projecting thick-walled portion 12, and the bolt bores 54b are formed in both end portions of the downwardly projecting thick-walled portion 13. A first end plate 17 and a second end plate 18, which are octagonal, are brought into contact with both ends of the cylinder body 11. The first and second end plates 17 and 18 each have insertion bores 55a to 55d extending respectively through the upper, lower, left and right portions thereof in coaxial relation to the bolt bores 54a and 54b and the insertion bores 53a and 53b of the cylinder body 11. Long bolts 57 are respectively inserted into the left and right insertion bores 55c and 55d of the first and second end plates 17 and 18 and further into the left and right insertion bores 53a and 53b of the cylinder body 11 and engaged with respective nuts 58. Short bolts 59 are respectively inserted into the upper and lower insertion bores 55a and 55b of the first and second end plates 17 and 18 and screwed into the upper and lower bolt bores 54a and 54b of the cylinder body 11. Thus, the first end plate 17 and the second end plate 18 are connected to both ends, respectively, of the cylinder body 11.

Figure 2:
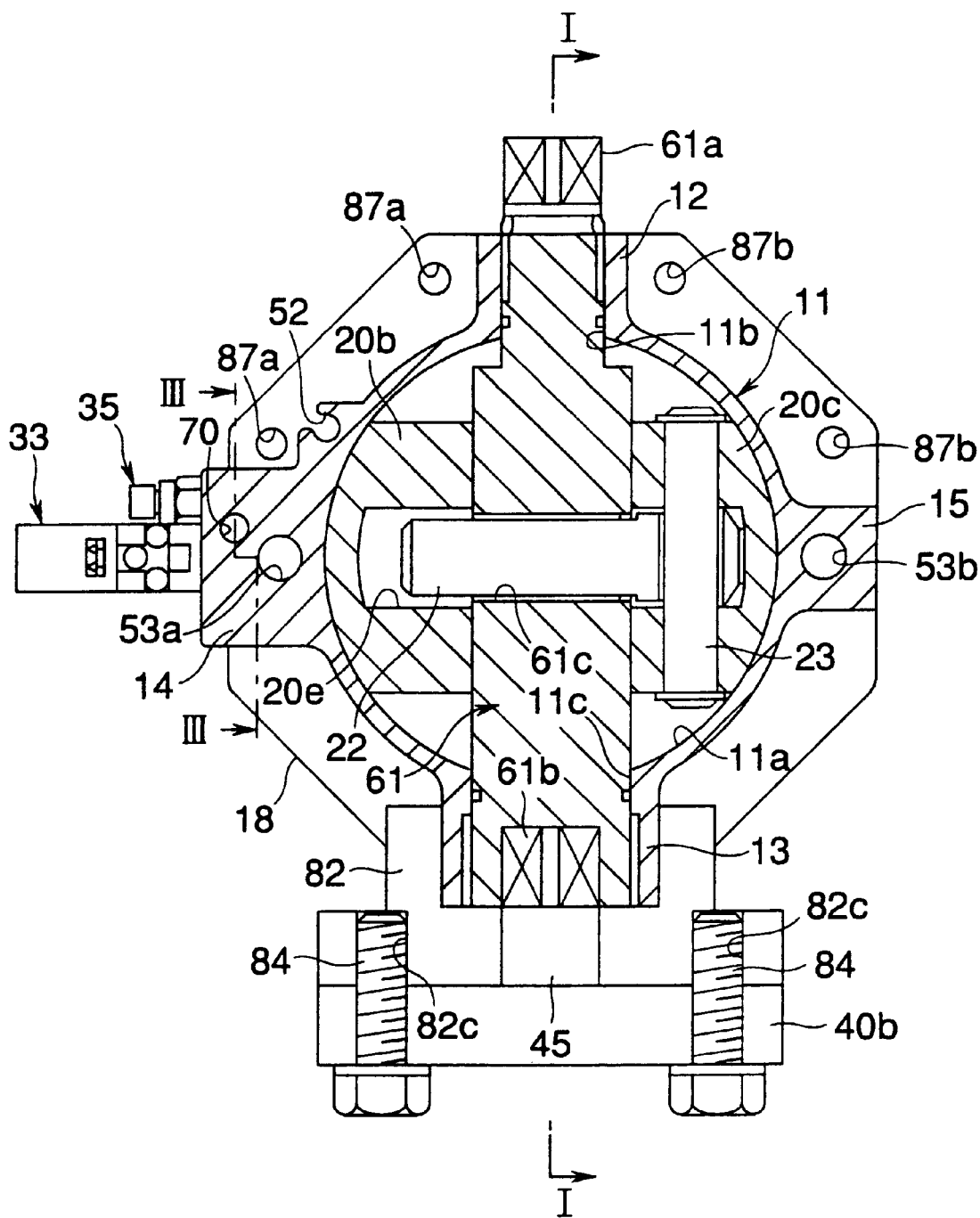
FIG. 2 is a sectional view taken along the line II—II in FIG. 1.

As shown in FIGS. 1 and 2, an upper bearing portion 11b and a lower bearing portion 11c are formed to extend through approximately central portions of the upwardly and downwardly projecting thick-walled portions 12 and 13, respectively, of the cylinder body 11. The diameter of the upper bearing portion 11b is smaller than the diameter of the lower bearing portion 11c. A stepped output shaft 61 having a small-diameter portion at the upper end thereof is inserted into the lower bearing portion 11c and the upper bearing portion 11b from the lower side thereof. The upper small-diameter end portion and the lower end portion of the output shaft 61 are rotatably fitted in and supported by the upper bearing portion 11b and the lower bearing portion 11c, respectively. The upper small-diameter end portion of the output shaft 61, which is rotatably supported by the upper bearing portion 11b, is provided with two annular grooves. A bearing metal is fitted in the upper annular groove, and a seal is fitted in the lower annular groove. The lower end portion of the output shaft 61, which is rotatably supported by the lower bearing portion 11c, is provided with a single annular groove, and a seal is fitted in the annular groove. A bearing metal is fitted in an annular groove provided in the lower bearing portion 11c. The output shaft 61 has a prismatic portion 61a formed at the upper end thereof. The prismatic portion 61a projects upwardly from the cylinder body 11. The output shaft 61 has a square hole 61b provided in the lower end portion thereof. The square hole 61b opens on the lower end of the output shaft 61.

Figure 13:
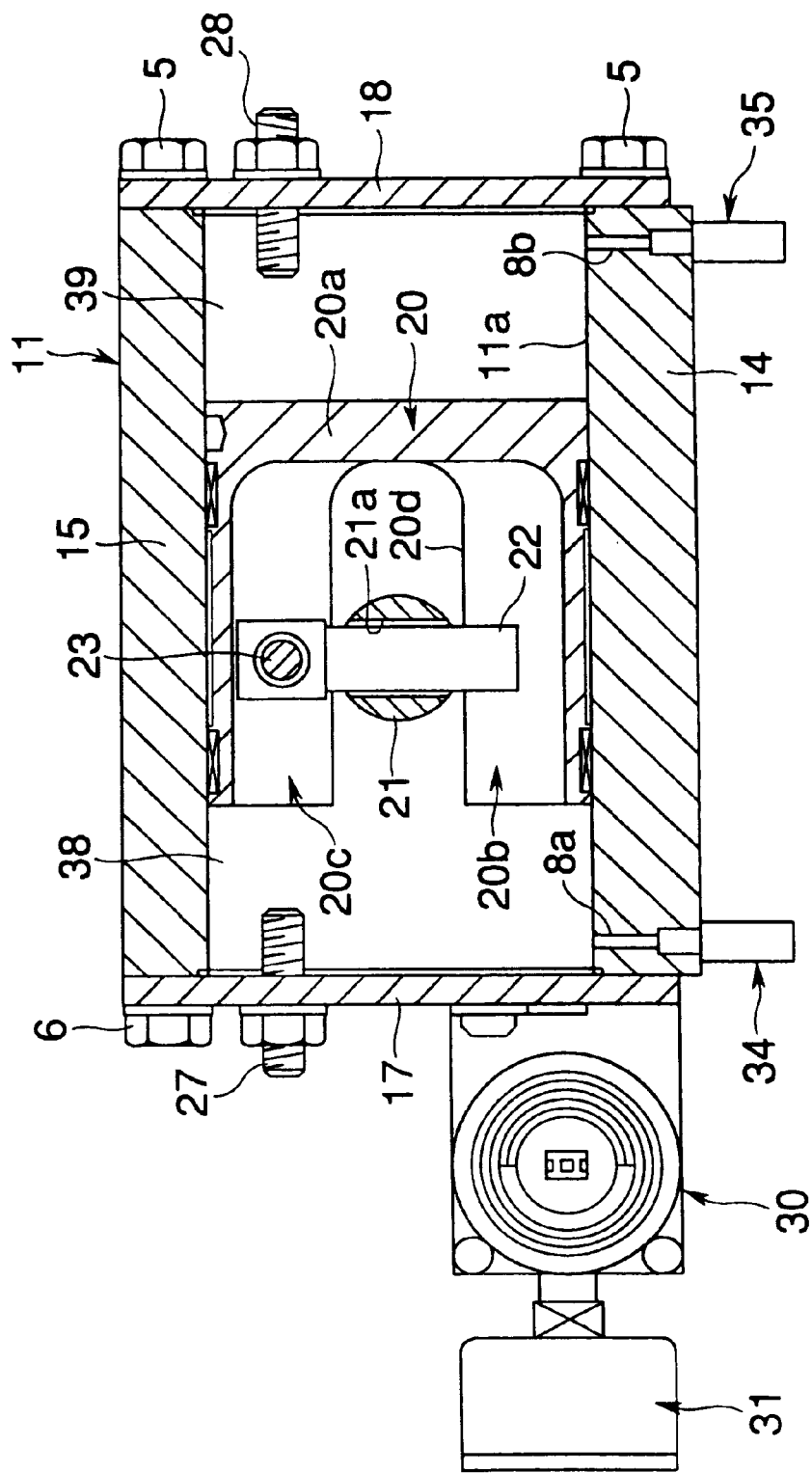
FIG. 13 is a top plan view of the conventional rotary actuator, showing the essential parts thereof in a transverse sectional view.
Figure 14A:
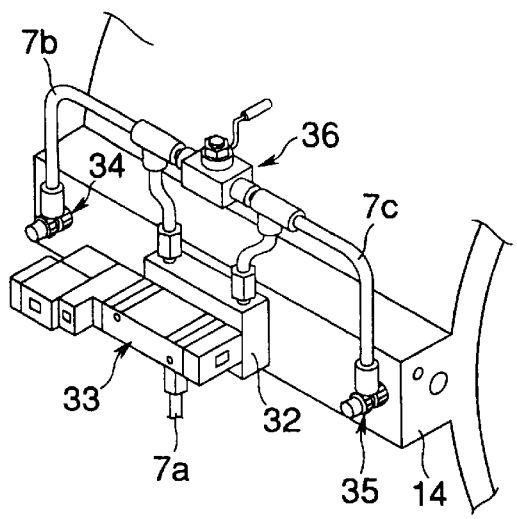
FIG. 14a is a perspective view showing a leftwardly projecting thick-walled portion and its vicinities of a cylinder body of the conventional rotary actuator.
Figure 14B:
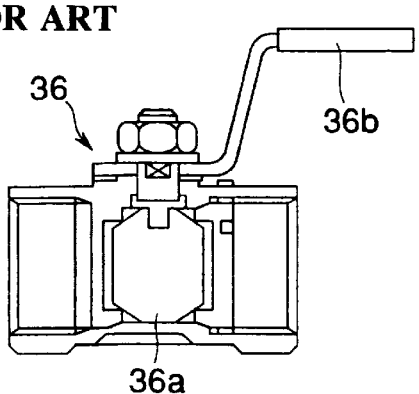
FIG. 14b is a vertical sectional view of an open valve used in the conventional rotary actuator.
Figure 14C:
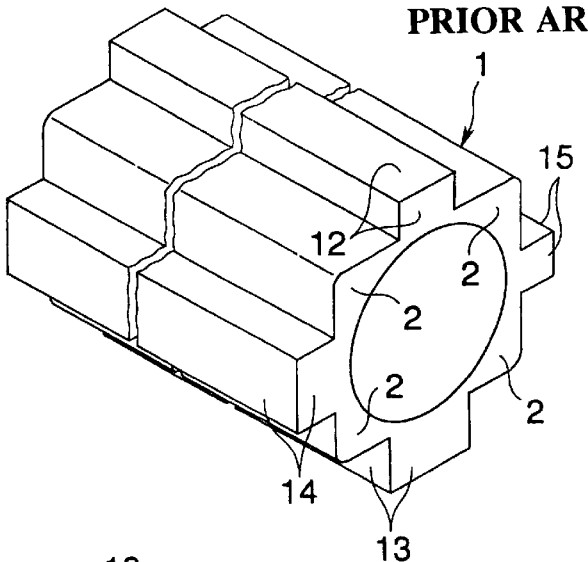
FIG. 14c is a perspective view of an extruded material for producing the cylinder body of the conventional rotary actuator.
Figure 14D:
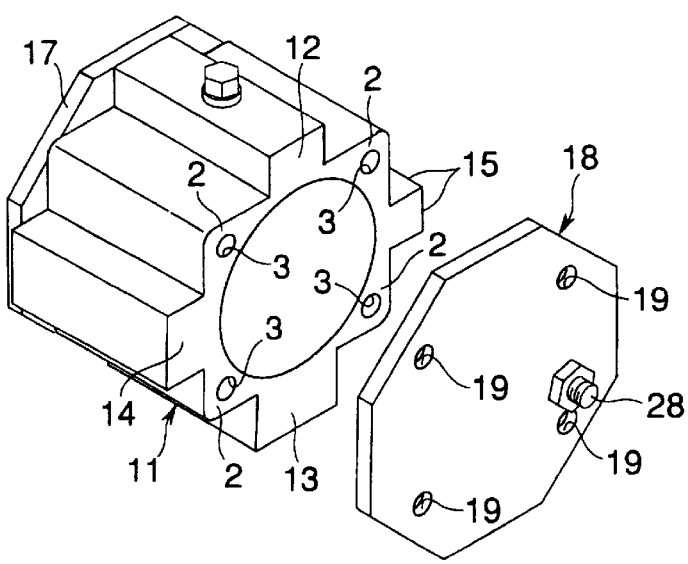
FIG. 14d is an exploded perspective view of the essential parts of the conventional rotary actuator.
Figure 15A:
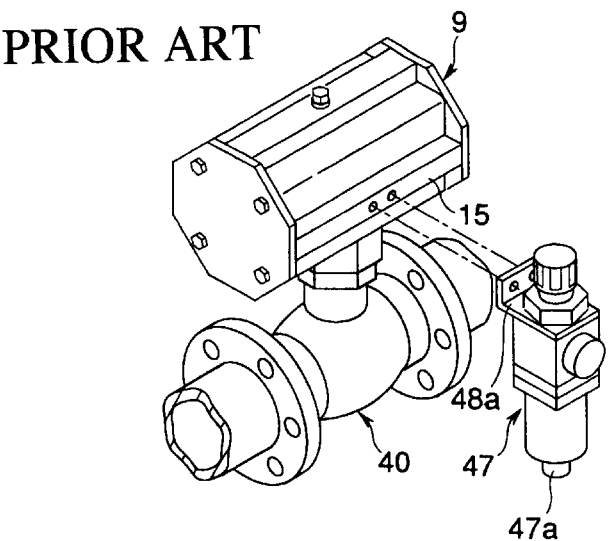
FIGS. 15a to 15c are perspective views showing methods of installing a filter onto the conventional rotary actuator.
Figure 15B:
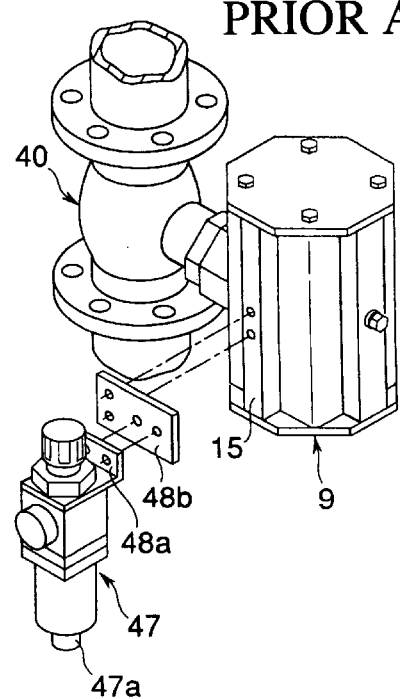
Figure 15C:
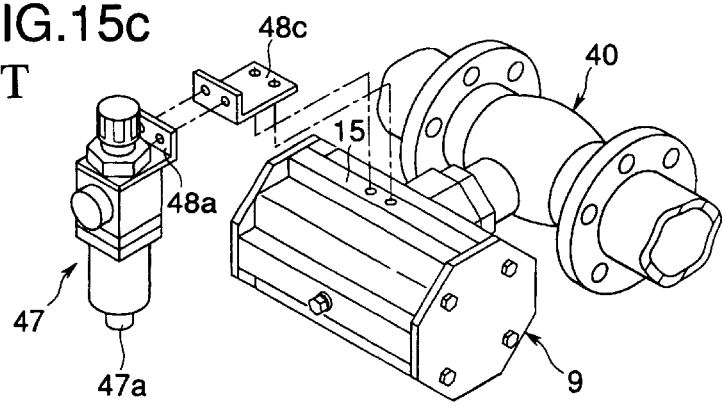

As will be clear from FIGS. 1 and 2, together with FIG. 13, which shows the prior art, a piston 20 having a structure similar to that in the prior art is slidably fitted in a cylinder bore 11a provided in the cylinder body 11. The piston 20 has a bottom portion 20a with a circular sectional configuration that receives an air pressure. The piston 20 further has a first projecting portion 20b and a second projecting portion 20c, which are integral with the bottom portion 20a. A seal 62 is fitted in an annular groove on the outer periphery of the bottom portion 20a. The upper and lower end portions of the piston 20, exclusive of the bottom portion 20a, are horizontally cut. The piston 20 has a vertical groove 20d vertically extending therethrough. The piston 20 further has longitudinal horizontal grooves 20e and 20f communicated with the vertical groove 20d. Thus, the first projecting portion 20b and the second projecting portion 20c are formed.

The second projecting portion 20c has an insertion bore vertically extending therethrough. A pin 23 is inserted into the insertion bore and stopped at the upper and lower ends thereof from coming out of the insertion bore. The output shaft 61 is located in the vertical groove 20d (see FIG. 13) between the first projecting portion 20b and the second projecting portion 20c. A yoke 22 is inserted into a horizontal bore 61c provided in the output shaft 61. One end of the yoke 22 is pivotably connected to the pin 23 in the horizontal groove 20f. The other end of the yoke 22 is movably inserted into the horizontal groove 20e of the first projecting portion 20b. As the piston 20 moves, the pin 23 also moves simultaneously. Because one end of the yoke 22 moves together with the pin 22, the yoke 22 pivots to rotate about the output shaft 61, causing the output shaft 61 to rotate. The first end plate 17 and the second end plate 18 are provided with a first stopper 27 and a second stopper 28, respectively, such that the first and second stoppers 27 and 28 can be adjusted, as in the case of the prior art.

Figure 9B:
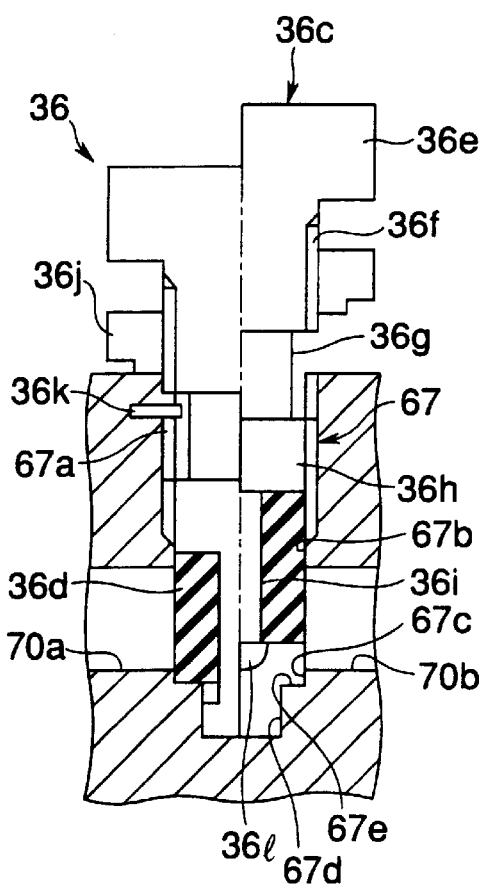
FIG. 9b is a vertical sectional view of an open valve according to the embodiment of the rotary actuator according to the present invention.
Figure 9C:
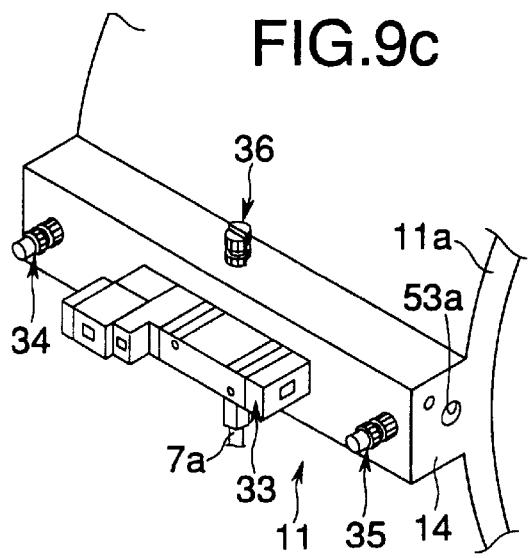
FIG. 9c is a perspective view showing a leftwardly projecting thick-walled portion and its vicinities of the cylinder body.

As shown in FIGS. 5 and 9c, a solenoid-operated switching valve 33 is brought into contact with the center of the front (left side) surface of the leftwardly projecting thick-walled portion 14 of the cylinder body 11 with a packing 63 interposed therebetween. The solenoid-operated switching valve 33 is connected to the leftwardly projecting thick-walled portion 14 by screwing two bolts 64 into tapped holes 66 (see FIG. 7a; described later). A first speed controller 34 and a second speed controller 35 are buried in respective positions near the left and right ends of the front surface of the leftwardly projecting thick-walled portion 14. An open valve 36 is buried in the center of the upper surface of the leftwardly projecting thick-walled portion 14.

As shown in FIGS. 3, 6 to 8d, a horizontal passage 70 is formed in the leftwardly projecting thick-walled portion 14 at a position slightly closer to the upper end and to the left (outer) end of the thick-walled portion 14. Both ends of the horizontal passage 70 are hermetically sealed. The left and right halves of the horizontal passage 70 as seen in a left-hand side view (e.g. FIG. 3) will hereinafter be referred to as "first horizontal passage 70a" and "second horizontal passage 70b", respectively. FIG. 8b shows a section in the center of the horizontal passage 70 (i.e. a sectional view taken along the line P—P in FIG. 7a). The first horizontal passage 70a and the second horizontal passage 70b are communicated with an open valve fitting bore 67. The open valve fitting bore 67 opens on the upper surface of the leftwardly projecting thick-walled portion 14. The open valve 36 is fitted in the open valve fitting bore 67. It should be noted that the insertion bore 53a lies slightly below and inside the horizontal passage 70. The insertion bore 53a and the horizontal passage 70 are not communicated with each other.

FIG. 9b clearly shows the open valve 36 according to the embodiment of the present invention. The open valve fitting bore 67 intersects the first and second first horizontal passages 70a and 70b. A stepped bore (having a large-diameter portion 67c, a small-diameter portion 67d, and a step portion 67e) is formed in the bottom of the connection between the first and second horizontal passages 70a and 70b. The open valve fitting bore 67 has an internal thread 67a on the upper portion thereof. That portion of the open valve fitting bore 67 which extends between the internal thread 67a and the intersection between the open valve fitting bore 67 and the first and second horizontal passages 70a and 70b is a non-threaded bore 67b. The non-threaded bore 67b and the large-diameter portion 67c have the same diameter. The step portion 67e is adapted to be contacted by an elastic valve element 36d. A valve rod 36c is fitted in the open valve fitting bore 67. The valve rod 36c has, from the top toward the bottom thereof, a knob portion 36e, an upper external thread portion 36f, an intermediate-diameter portion 36g, a lower external thread portion 36h, a small-diameter portion 36i, and a retaining portion 36l at the distal end. The upper external thread portion 36f is engaged with a lock nut 36j for fixing. The intermediate-diameter portion 36g is engaged with a fall-preventing stopper pin 36k projecting from the inner wall of the open valve fitting bore 67. The lower external thread portion 36h is engaged with the internal thread 67a. The small-diameter portion 36i is fitted with an annular elastic valve element 36d. The elastic valve element 36d is produced from an elastic material, e.g. a synthetic rubber.

Because the stopper pin 36k projects only slightly from the inner wall of the open valve fitting bore 67, if the valve rod 36c is pushed into the open valve fitting bore 67 and screwed thereinto by turning the knob portion 36e, the valve rod 36c is fitted in the position as shown in FIG. 9b. The right-hand half of FIG. 9b shows a position where the elastic valve element 36d allows communication between the first horizontal passage 70a and the second horizontal passage 70b. In this position, the first cylinder chamber 38 and the second cylinder chamber 39 are communicated with each other through the first and second horizontal passages 70a and 70b and via the first and second speed controllers 34 and 35 and the open valve 36. Consequently, the output shaft 61 can be rotated by a manual operation. The left-hand half of FIG. 9b shows a position where the lower end of the elastic valve element 36d is pressed against the step portion 67e of the open valve fitting bore 67, and thus the first horizontal passage 70a and the second horizontal passage 70b are cut off from each other. In this position, the passages for communication between the first cylinder chamber 38 and the second cylinder chamber 39 are cut off from each other.

Figure 7A:
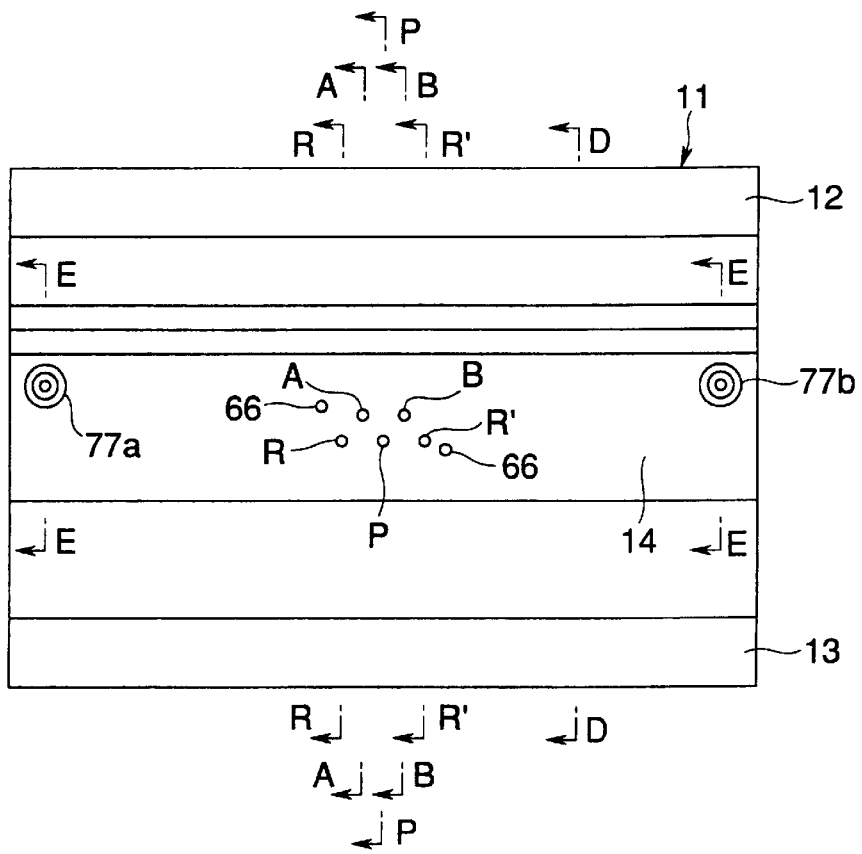
FIG. 7a is a side view of a cylinder body in the embodiment of the rotary actuator as viewed from the left-hand side thereof.
Figure 7B:
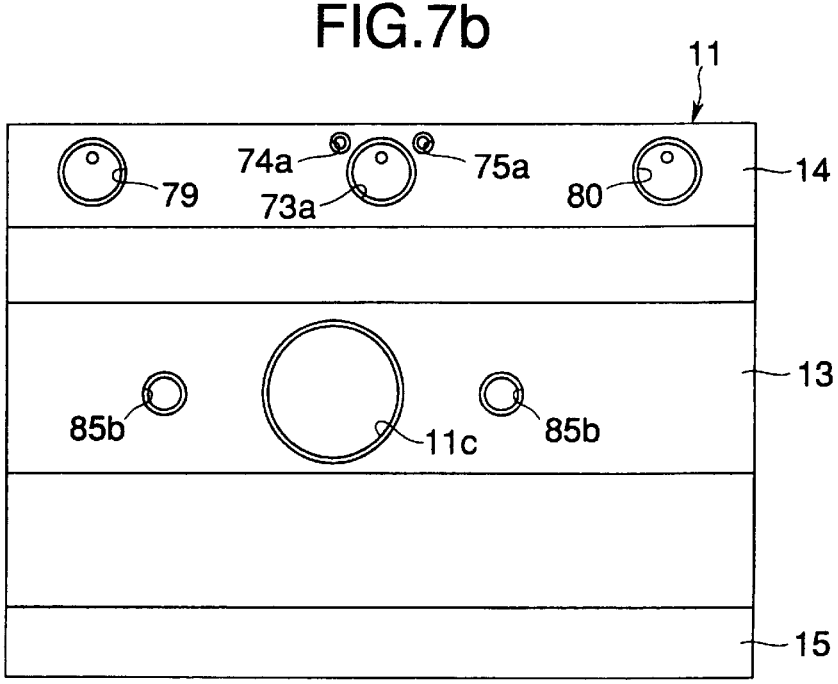
FIG. 7b is a bottom view of the cylinder body.
Figure 8A:
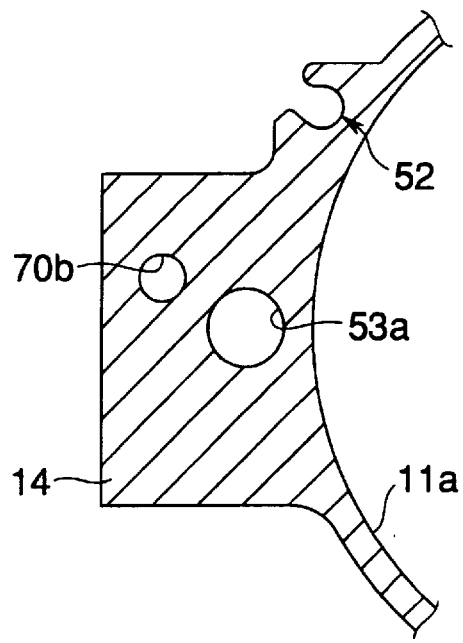
Figure 8B:
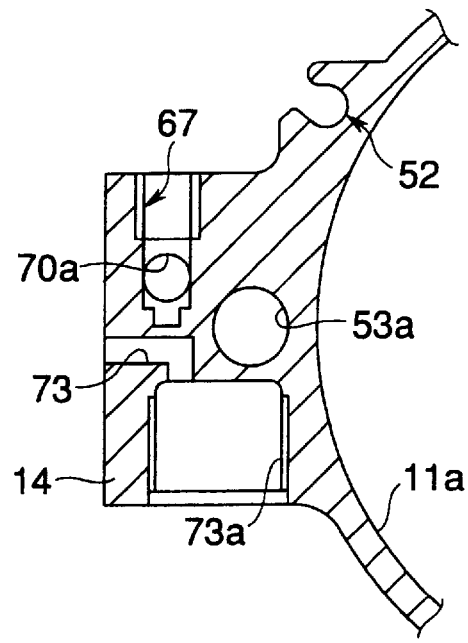

As shown in FIGS. 5, 7a, 8a to 8d, one end of each of an A-passage 71, a B-passage 72, a P-passage 73, an R-passage 74 and an R'-passage 75 opens on the front (left side) surface of the leftwardly projecting thick-walled portion 14, and two tapped holes 66 open on the same surface. The abutting surfaces of the packing 63 and the solenoid-operated switching valve 33 are provided with communicating bores that agree with the openings of the passages 71 to 75 in spacing and diameter. The A-port, B-port, P-port, R-port and R'-port of the solenoid-operated switching valve 33 are communicated with the A-passage 71, the B-passage 72, the P-passage 73, the R-passage 74 and the R'-passage 75 through the respective communicating bores in the packing 63. As shown in FIG. 8b, the leftwardly projecting thick-walled portion 14 is provided with an air supply bore 73a opening on the lower surface thereof. The other end of the P-passage 73 is communicated with the air supply bore 73a. Piping 7a connected to an outlet port of a pressure reducing valve is connected to the air supply bore 73a, so that compressed air is supplied to the P-port of the solenoid-operated switching valve 33 from an air pressure source through the pressure reducing valve, the piping 7a (FIG. 9c) and the P-passage 73.

Figure 6:
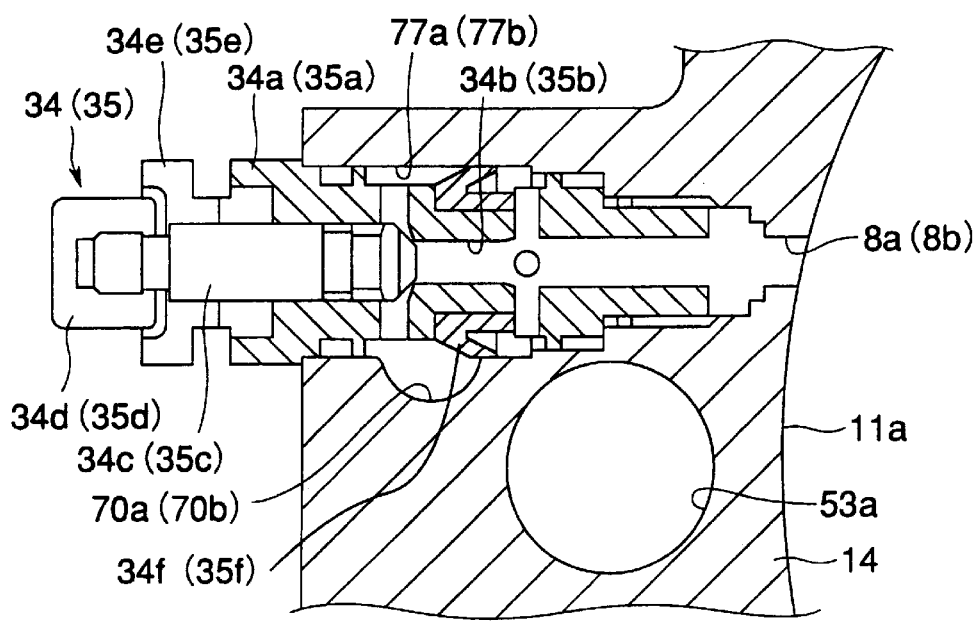
Figure 8C:
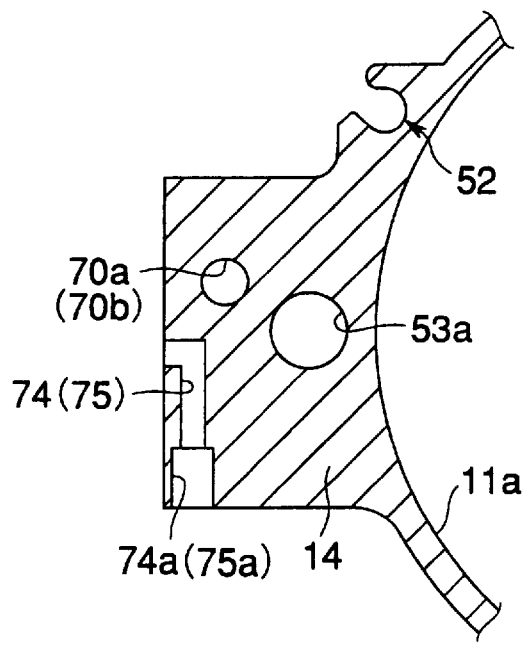
Figure 8D:
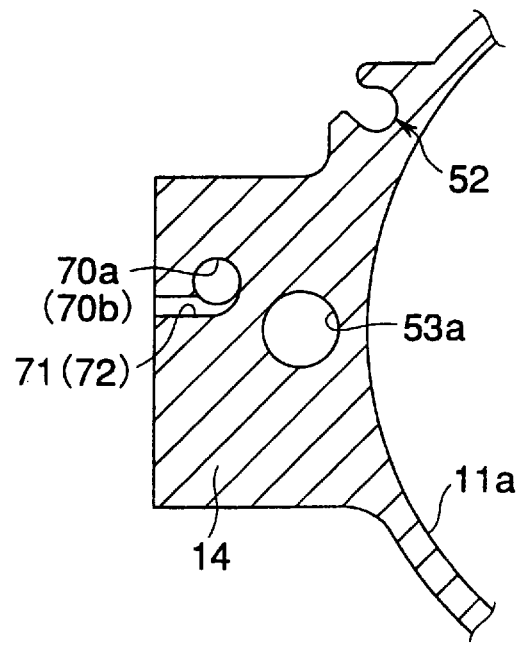

As shown in FIG. 8d (a sectional view taken along the line A—A (B—B) in FIG. 7a), the other ends of the A-passage 71 and the B-passage 72 are communicated with the first horizontal passage 70a and the second horizontal passage 70b, respectively. As shown in FIG. 6 (a sectional view taken along the line E—E in FIG. 7b), the first horizontal passage 70a and the second horizontal passage 70b are communicated with the first cylinder chamber 38 and the second cylinder chamber 39 via the first speed controller 34 and the second speed controller 35 and through the communicating passage 8a and the communicating passage 8b, respectively. As shown in FIGS. 5 and 6, the leftwardly projecting thick-walled portion 14 is provided with fitting bores 77a and 77b opening on the front surface thereof. The body 34a of the first speed controller 34 and the body 35a of the second speed controller 35 are screwed into the fitting bores 77a and 77b, thereby fitting the first and second speed controllers 34 and 35. The body 34a (35a) is provided with a passage 34b (35b) for providing communication between the horizontal passage 70a (70b) and the communicating passage 8a (8b). The flow rate in the passage 34b (35b) is controlled by a needle 34c (35c). The needle 34c (35c) is controlled with a handle 34d (35d) and fixed with a lock nut 34e (35e). A check valve 34f (35f) is placed between the body 34a (35a) and the fitting bore 77a (77b). The check valve 34f (35f) and the passage 34b (35b) are disposed in parallel to each other. The check valve 34f (35f) allows the flow of air from the horizontal passage 70a (70b) to the communicating passage 8a (8b) but checks the flow of air in the opposite direction. The first speed controller 34 and the second speed controller 35 are meter-out type speed controllers.

As shown in FIG. 8c (a sectional view taken along the line R—R (R'—R') in FIG. 7a), the leftwardly projecting thick-walled portion 14 is provided with an air exhaust bore 74a (75a) opening on the lower surface thereof. The R-port (R'-port) of the solenoid-operated switching valve 33 is communicated with the atmosphere through the R-passage 74 (R'-passage 75) and the air exhaust bore 74a (75a). When the solenoid-operated switching valve 33 is in one position, compressed air is supplied from the P-port and passed through the A-passage 71, the first horizontal passage 70a, the first speed controller 34 (check valve 34f) and the communicating passage 8a to flow into the first cylinder chamber 38. At this time, the air in the second cylinder chamber 39 flows through the communicating passage 8b, the second speed controller 35 (passage 35b; flow control portion), the second horizontal passage 70b, the B-passage 72 and the B-port of the solenoid-operated switching valve 33 to the R'-port. The air further flows through the R'-passage 75 and the air exhaust bore 75a and is released into the atmosphere. When the solenoid-operated switching valve 33 is in the other position, compressed air flows into the second cylinder chamber 39, and the air in the first cylinder chamber 38 is released into the atmosphere.

Figure 3:
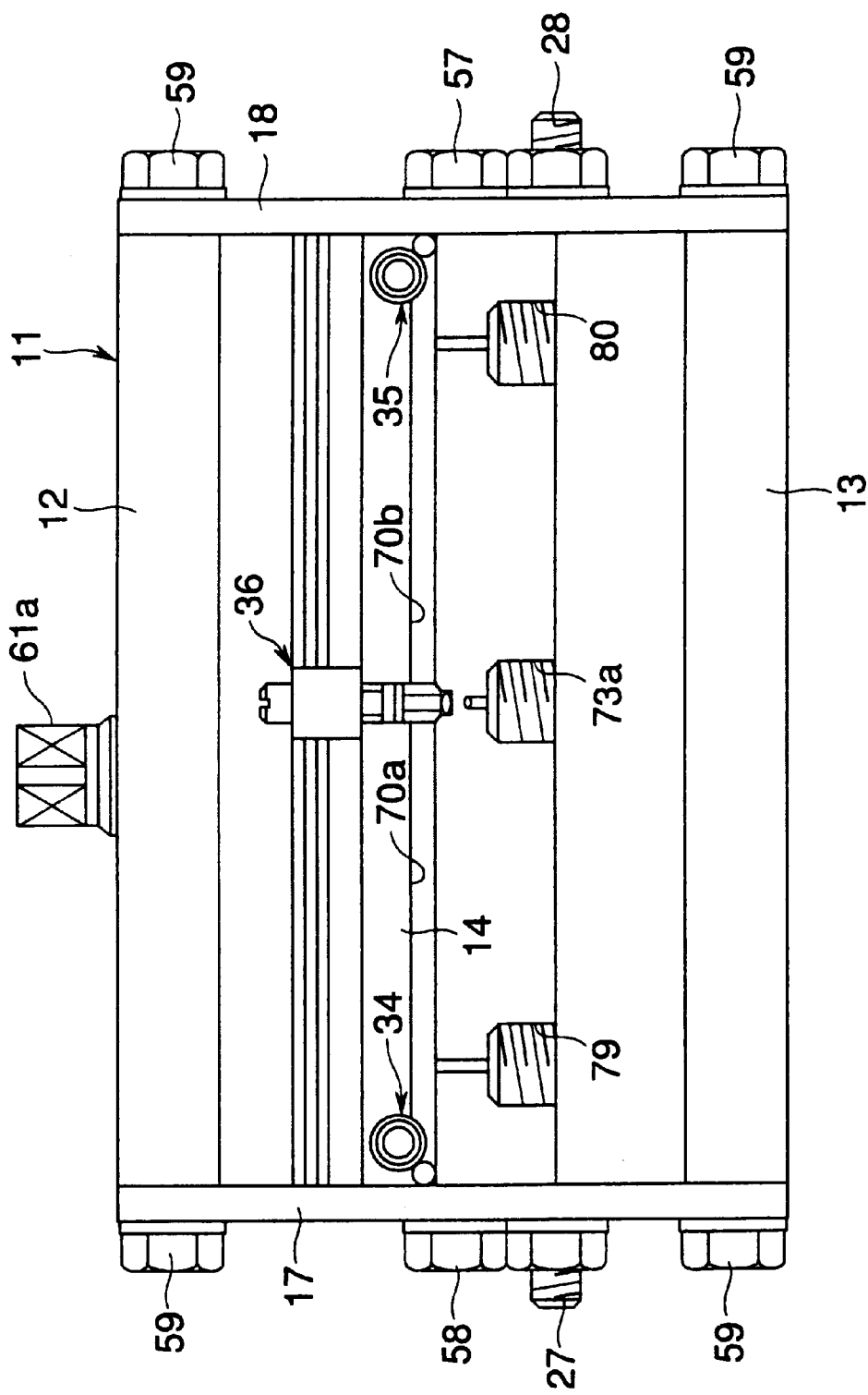
FIG. 3 is a side view containing a sectional view taken along the line III—III in FIG. 2.

In the embodiment of the present invention, there are cases where it is desired to use the rotary actuator without connecting the solenoid-operated switching valve 33 to the leftwardly projecting thick-walled portion 14. For such use application, as shown in FIG. 3, a first supply and exhaust bore 79 and a second supply and exhaust bore 80 are formed in the leftwardly projecting thick-walled portion 14 at respective positions slightly closer to the center than the first speed controller 34 and the second speed controller 35 as seen in a left-hand side view. The first supply and exhaust bore 79 and the second supply and exhaust bore 80 have the same structure as that of the air supply bore 73a. The first supply and exhaust bore 79 and the second supply and exhaust bore 80 open on the lower surface of the leftwardly projecting thick-walled portion 14 and are communicated with the first horizontal passage 70a and the second horizontal passage 70b, respectively. When the rotary actuator is used with the solenoid-operated switching valve 33 connected to the leftwardly projecting thick-walled portion 14, the first supply and exhaust bore 79 and the second supply and exhaust bore 80 are hermetically sealed with plugs screwed thereinto.

When it is desired to use the rotary actuator without connecting the solenoid-operated switching valve 33 to the leftwardly projecting thick-walled portion 14, the plugs are removed from the first supply and exhaust bore 79 and the second supply and exhaust bore 80, and the two bores 79 and 80 are communicated with the A-port and B-port, respectively, of a switching valve (not shown). Then, the solenoid-operated switching valve 33 is detached from the surface of the leftwardly projecting thick-walled portion 14, and a plate for hermetic sealing is connected to the surface of the leftwardly projecting thick-walled portion 14 in place of the solenoid-operated switching valve 33 to block the openings of the passages 71 to 75. Thus, the piston 20 can be moved by actuating the switching valve (not shown).

As shown in FIGS. 1 and 2, the upwardly projecting thick-walled portion 12 is provided with two non-through bolt bores 85a opening on the upper end surface thereof, and the downwardly projecting thick-walled portion 13 is provided with two non-through bolt bores 85b opening on the lower end surface thereof. The two bolt bores 85a and the two bolt bores 85b are a predetermined distance away from the upper bearing portion 11b and the lower bearing portion 11c, respectively. A connecting member 82 has a longitudinal U-shaped groove formed in the upper surface thereof and further has two stepped bolt insertion bores 82b. The connecting member 82 is fitted to the downwardly projecting thick-walled portion 13. Bolts 83 are respectively inserted into the bolt insertion bores 82b and screwed into the bolt bores 85b, thereby connecting the connecting member 82 to the downwardly projecting thick-walled portion 13. The connecting member 82 has a shaft insertion bore 82a formed in the bottom of the U-shaped groove. The shaft insertion bore 82a and the lower bearing portion 11c lie on the same axis. As shown in FIG. 2, the connecting member 82 has two bolt bores 82c formed in the vicinities of the left and right ends thereof. An upper flange 40b of a valve (e.g. a butterfly valve or a ball valve) 40 is brought into contact with the lower surface of the connecting member 82. Two bolts 84 are inserted into respective insertion bores in the upper flange portion 40b and screwed into the bolt bores 82c of the connecting member 82, thereby connecting together the connecting member 82 and the valve 40. At this time, a prismatic portion at the upper end of a control shaft 45 of the valve 40 is fitted into the square hole 61b at the lower end of the output shaft 61. Thus, the rotation of the output shaft 61 is transmitted to the control shaft 45.

Figure 4:
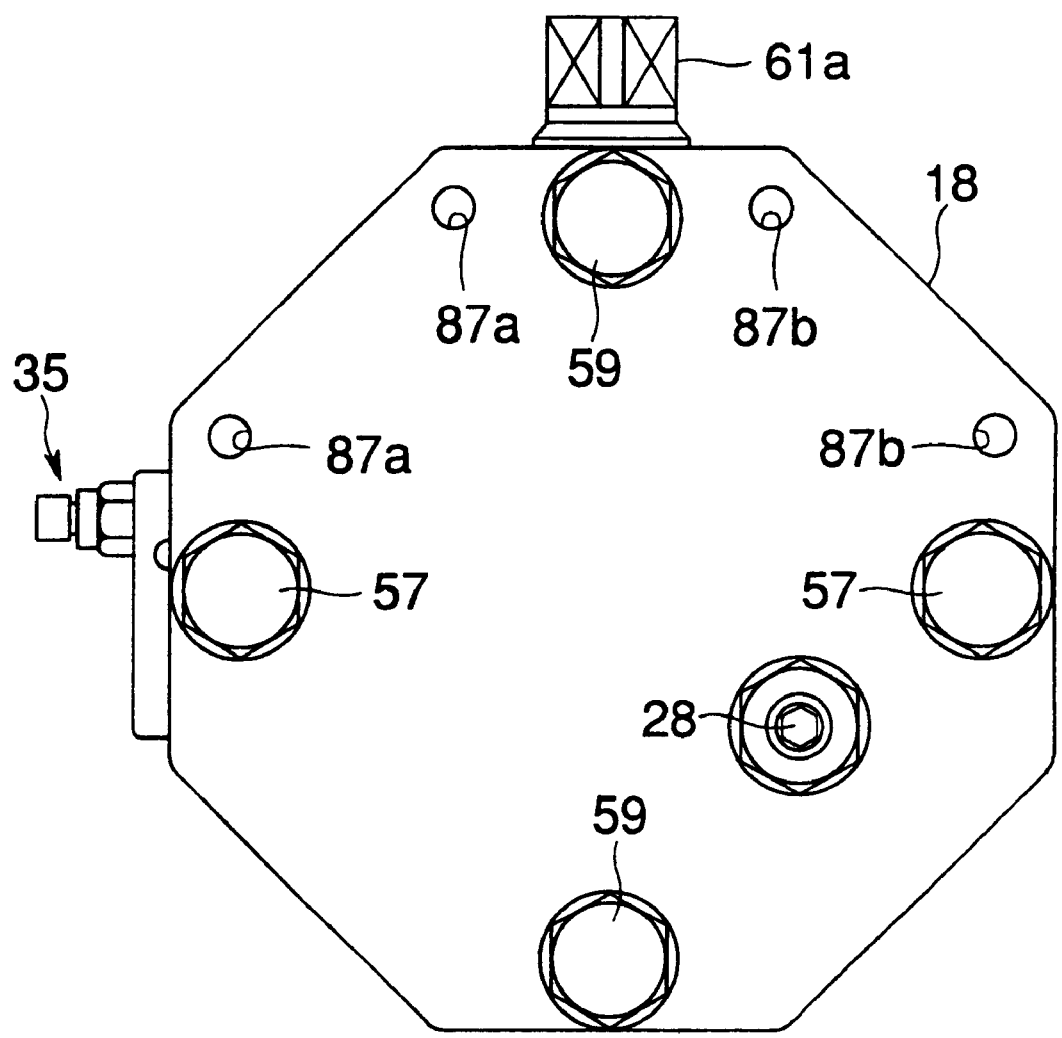
FIG. 4 is a front view of the embodiment as seen from the right-hand side in FIG. 3.
Figure 10A:
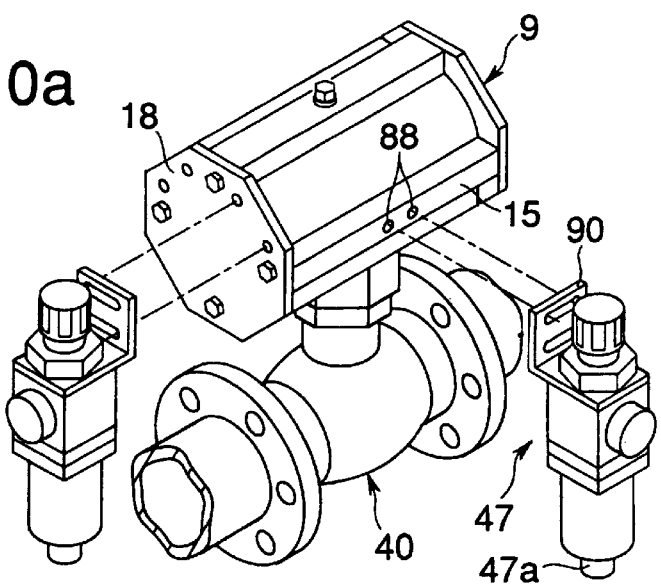
FIGS. 10a to 10c are perspective views showing filter installation methods according to the embodiment of the present invention.

As shown in FIGS. 4, 5 and 10a, the first end plate 17 and the second end plate 18 each have two bolt bores 87a provided in the upper left portion thereof and two bolt bores 87b in the upper right portion thereof as viewed in FIG. 4. The cylinder body 11 is provided with two bolt bores 88 opening on the right side surface of the rightwardly projecting thick-walled portion 15. The spacing between the two bolt bores 88 is the same as the spacing between the two bolt bores 87a and the spacing between the two bolt bores 87b. A filter 47 is connected to the rotary actuator 9 through an L-shaped bracket 90 and short bolts by using two bolt bores 88, 87a or 87b. One end portion of the L-shaped bracket 90 is provided with a connecting bore for connection to the filter 47, and the other end portion of the L-shaped bracket 90 is provided with a pair of upper and lower horizontally elongated insertion holes for insertion of short bolts.

Figure 10B:
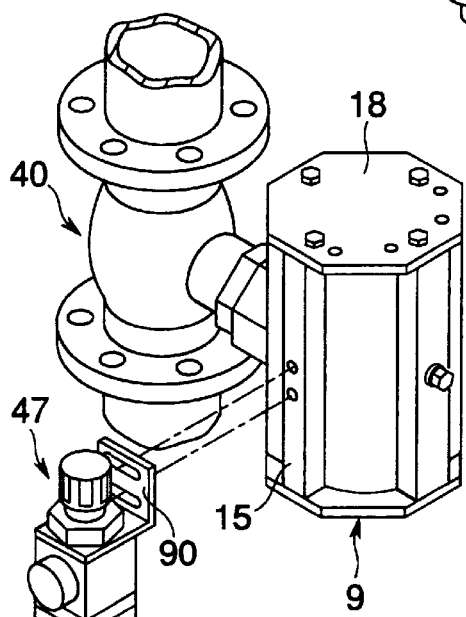
Figure 10C:
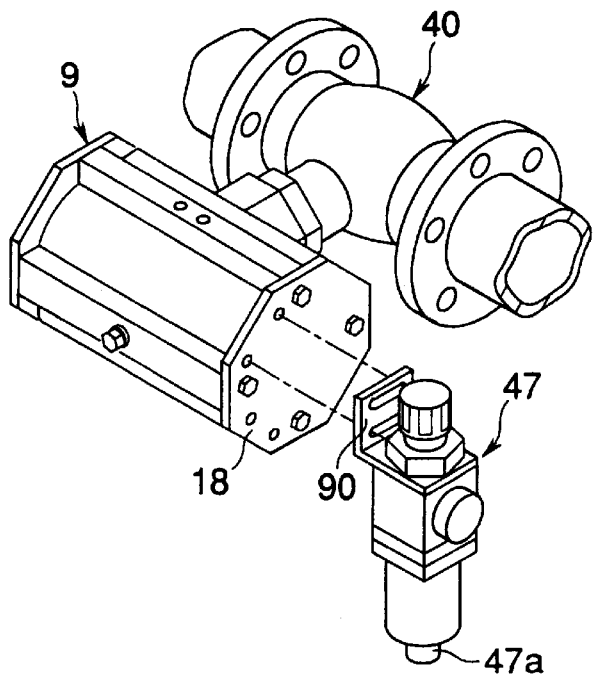
Figure 11:
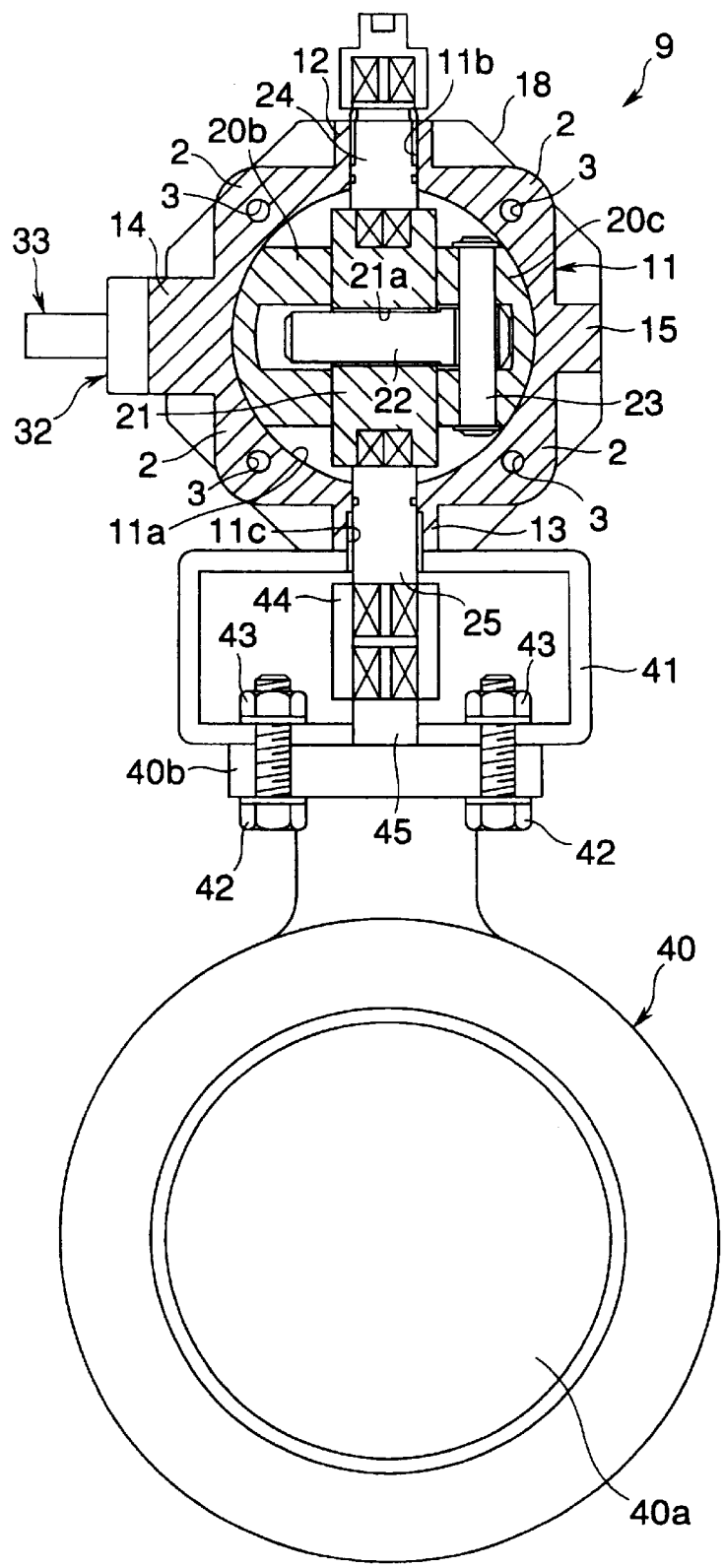
FIG. 11 is a sectional front view showing a conventional rotary actuator with a valve connected thereto.
Figure 12:
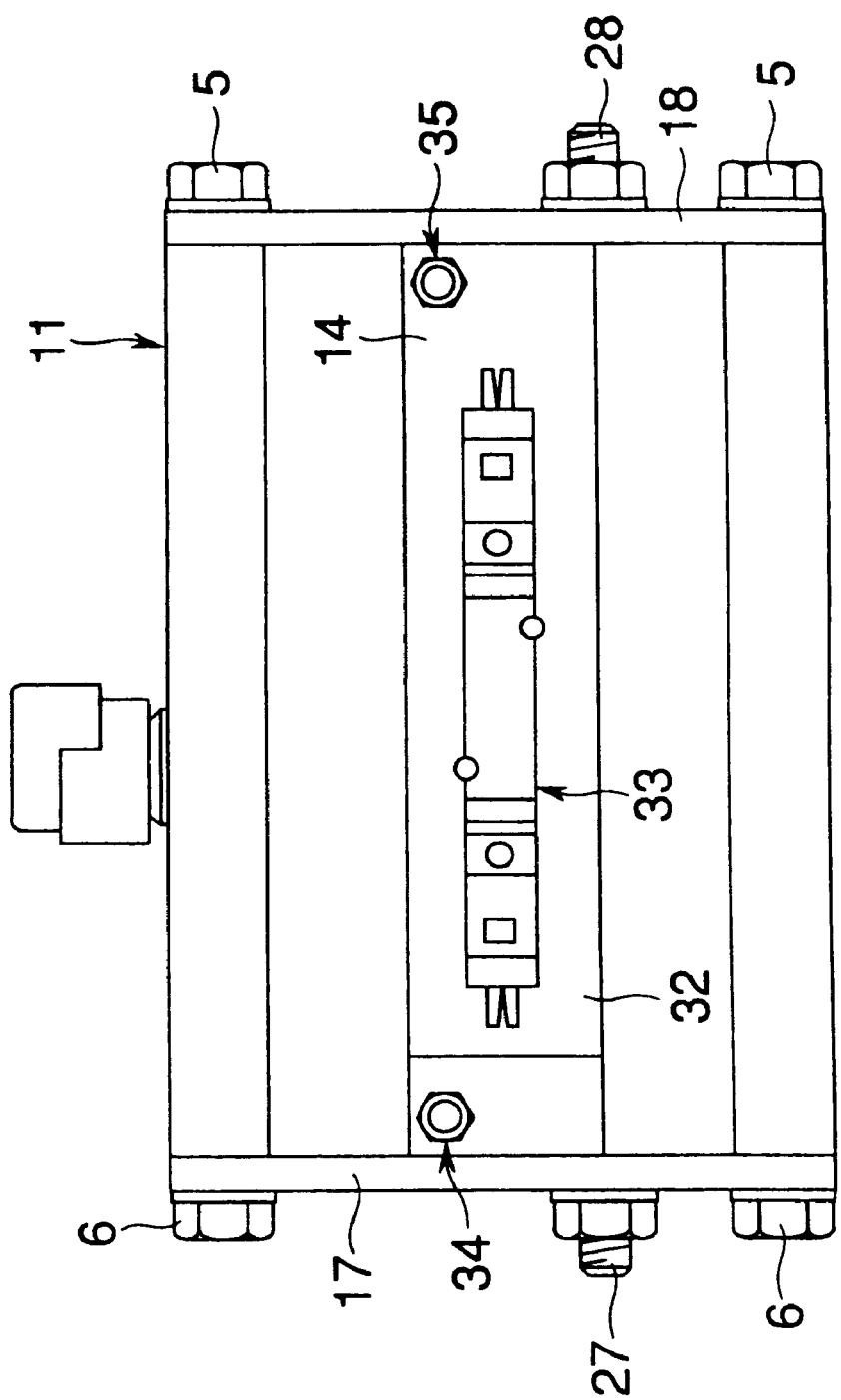
FIG. 12 is a side view of the essential parts of the conventional rotary actuator as viewed from the left-hand side thereof.

FIGS. 10a to 10c show methods of installing the filter 47 onto the rotary actuator 9. One end portion of the L-shaped bracket 90 is connected to the filter 47 through the connecting bore. When the rightwardly projecting thick-walled portion 15 lies horizontally as shown in FIG. 10a, short bolts are inserted into either the upper or lower horizontally elongated insertion hole of the L-shaped bracket 90 and screwed into the two bolt bores 88 of the rightwardly projecting thick-walled portion 15. Alternately, short bolts are inserted into the upper and lower horizontally elongated insertion holes, respectively, of the L-shaped bracket 90 and screwed into the bolt bores 87a or 87b of the first end plate 17 or the second end plate 18. When the rightwardly projecting thick-walled portion 15 lies vertically as shown in FIG. 10b, short bolts are inserted into the upper and lower horizontally elongated insertion holes, respectively, of the L-shaped bracket 90 and screwed into the two bolt bores 88 of the rightwardly projecting thick-walled portion 15. When the rightwardly projecting thick-walled portion 15 faces upward as shown in FIG. 10c, short bolts are inserted into the upper and lower horizontally elongated insertion holes, respectively, of the L-shaped bracket 90 and screwed into the bolt bores 87a or 87b of the first end plate 17 or the second end plate 18. In this way, the filter 47 can be installed vertically.

What is claimed is:

1. In a rotary actuator of the type wherein two end plates are connected to both ends, respectively, of a cylinder body, and a piston is slidably fitted in a cylinder bore in said cylinder body, and wherein an output shaft is disposed to extend in a direction approximately perpendicular to an axis of said piston, so that a reciprocating motion of said piston is converted into a rotational motion of said output shaft, the improvement wherein said cylinder body is produced from an extruded material formed by extrusion; a section of said extruded material that is perpendicular to a direction of extrusion of said extruded material is circular at an inner periphery thereof and has upwardly, downwardly, leftwardly and rightwardly projecting thick-walled portions at an outer periphery thereof; and outer peripheral portions of said section, exclusive of said projecting thick-walled portions, are generally formed from circular arcs and define with said circular inner periphery generally arcuate wall portions that are thinner than said thick-walled portions.

2. A rotary actuator according to claim 1, wherein said leftwardly and rightwardly projecting thick-walled portions of said cylinder body have insertion holes extending therethrough longitudinally; said upwardly and downwardly projecting thick-walled portions have bolt bores with a predetermined length formed in both end portions thereof; said two end plates each have insertion bores respectively extending through upper, lower, left and right portions thereof; long bolts are respectively inserted into the insertion bores in the left and right portions of said two end plates and further into the insertion bores in said leftwardly and rightwardly projecting thick-walled portions of said cylinder body and engaged with respective nuts; and short bolts are respectively inserted into the insertion bores in the upper and lower portions of said two end plates and screwed into the bolt bores in said upwardly and downwardly projecting thick-walled portions of said cylinder body.

3. In a rotary actuator of the type wherein two end plates are connected to both ends, respectively, of a cylinder body, and a piston is slidably fitted in a cylinder bore in said cylinder body, and wherein an output shaft is disposed to extend in a direction approximately perpendicular to an axis of said piston, so that a reciprocating motion of said piston is converted into a rotational motion of said output shaft, the improvement wherein said cylinder body is produced from an extruded material formed by extrusion; a section of said extruded material that is perpendicular to a direction of extrusion of said extruded material is circular at an inner periphery thereof and has a leftwardly projecting thick-walled portion at an outer periphery thereof; said leftwardly projecting thick-walled portion has an A-passage, a B-passage, a P-passage, an R-passage and an R'-passage communicated with an A-port, a B-port, a P-port, an R-port and an R'-port, respectively, of a solenoid-operated switching valve; one end of each of said A-passage, B-passage, P-passage, R-passage and R'-passage opens on a left side surface of said leftwardly projecting thick-walled portion; the other end of said A-passage is communicated with a first cylinder chamber through a first horizontal passage; the other end of said B-passage is communicated with a second cylinder chamber through a second horizontal passage; the other end of said P-passage is communicated with an air supply bore opening on a lower surface of said leftwardly projecting thick-walled portion; and the other ends of said R-passage and R'-passage are communicated with an air exhaust bore opening on the lower surface of said leftwardly projecting thick-walled portion.

4. A rotary actuator according to claim 3, wherein said leftwardly projecting thick-walled portion has an open valve fitting bore vertically formed therein; an upper end of said open valve fitting bore opens on an upper surface of said leftwardly projecting thick-walled portion; a lower end portion of said open valve fitting bore is communicated with said first horizontal passage and said second horizontal passage; a valve rod is placed in thread engagement with said open valve fitting bore; and an elastic valve element is fitted on a small-diameter portion near a lower end of said valve rod, so that rotating said valve rod causes said elastic valve element to move to a position where said first horizontal passage and said second horizontal passage are communicated with each other or to a position where said first horizontal passage and said second horizontal passage are cut off from each other.

5. A rotary actuator according to claim 3 or 4, wherein said leftwardly projecting thick-walled portion has fitting bores formed at respective positions near both ends thereof; one end of each of said fitting bores opens on the left side surface of said leftwardly projecting thick-walled portion; the other ends of said fitting bores are communicated with said first cylinder chamber and said second cylinder chamber through communicating passages, respectively; a body of a first speed controller and a body of a second speed controller are fitted in said fitting bores, respectively; said first horizontal passage and said second horizontal passage are communicated with said communicating passages through flow control portions and passages, respectively, which are provided in the bodies of said first and second speed controllers; and said first horizontal passage and said second horizontal passage are communicated with said communicating passages through check valves, respectively, which are provided between said fitting bores and the bodies of said first and second speed controllers.

6. In a rotary actuator of the type wherein two end plates are connected to both ends, respectively, of a cylinder body, and a piston is slidably fitted in a cylinder bore in said cylinder body, and wherein an output shaft is disposed to extend in a direction approximately perpendicular to an axis of said piston, so that a reciprocating motion of said piston is converted into a rotational motion of said output shaft, the improvement wherein said cylinder body is produced from an extruded material formed by extrusion; a section of said extruded material that is perpendicular to a direction of extrusion of said extruded material is circular at an inner periphery thereof and has upwardly and downwardly projecting thick-walled portions at an outer periphery thereof; said upwardly projecting thick-walled portion has an upper bearing portion vertically extending through a central portion thereof; said downwardly projecting thick-walled portion has a lower bearing portion vertically extending through a central portion thereof; said upper bearing portion has an inner diameter smaller than an inner diameter of said lower bearing portion; said output shaft is a stepped output shaft having at an upper end thereof a smaller-diameter portion rotatably fitted in said upper bearing portion; a lower end portion of said output shaft is rotatably fitted in said lower bearing portion; and a square hole opens on a lower end surface of said output shaft; a connecting member having a longitudinal U-shaped groove on an upper surface thereof is connected to said downwardly projecting thick-walled portion; said connecting member has a shaft insertion bore extending through a bottom of said U-shaped groove thereof such that said shaft insertion bore lies in coaxial relation to said lower bearing portion of said downwardly projection thick-walled portion; a prismatic portion at an upper end of a control shaft of a valve is fittable into said square hole at the lower end of said output shaft through said shaft insertion bore; and an upper flange of said valve is connectable to said connecting member.

7. In a rotary actuator of the type wherein two end plates are connected to both ends, respectively, of a cylinder body, and a piston is slidably fitted in a cylinder bore in said cylinder body, and wherein an output shaft is disposed to extend in a direction approximately perpendicular to an axis of said piston, so that a reciprocating motion of said piston is converted into a rotational motion of said output shaft, the improvement wherein said cylinder body is produced from an extruded material formed by extrusion; a section of said extruded material that is perpendicular to a direction of extrusion of said extruded material is circular at an inner periphery thereof and has upwardly, downwardly, leftwardly and rightwardly projecting thick-walled portions at an outer periphery thereof; said rightwardly projecting thick-walled portion has a pair of bolt bores opening on a right side surface thereof; said two end plates each have a pair of bolt bores opening on each of upper left and upper right portions of each end plate; a filter is fitted into an insertion bore in one end portion of an L-shaped bracket; and two short bolts are inserted into either or both of upper and lower horizontally elongated insertion holes in the other end portion of said L-shaped bracket and screwed into any one of said pairs of bolt bores.

* * * * *